3,329,726
CHAIN ALKYLATION OF MERCAPTO AND SELENYL AROMATIC COMPOUNDS IN THE PRESENCE OF AN INTERNAL ORDERED ALUMINO-SILICATE CATALYST
Phillip S. Landis, Woodbury, and Paul B. Venuto, Cherry Hill, N.J., assignors to Mobil Oil Corporation, a corporation of New York
No Drawing. Filed Feb. 14, 1966, Ser. No. 527,106
14 Claims. (Cl. 260—609)

This invention relates to the chain alkylation of aromatic compounds in the presence of an alumino-silicate having unique activity and in particular chain alkylation of aromatic compounds having mercapto and the like reacting polar substituents in the presence of these alumino-silicate catalysts. This application is a continuation-in-part of our pending application Ser. No. 275,521, filed Apr. 25, 1963, now abandoned.

This invention contemplates alkylation of aromatic compounds having mercapto and the like reacting polar substituents attached to an aromatic nucleus in the presence of a catalyst prepared from an alumino-silicate having active cation sites within its ordered internal structure. These cation sites are formed by the presence of exchangeable cations, metal and/or hydrogen ($H^+$), ionically bonded or chemisorbed within the order internal structure of the alumino-silicate catalyst; preferably, the cations are such that a portion of the active cation sites formed are acid sites. The expression "acid site" refers to an active cation site formed by a hydrogen cation ($H^+$).

In particular, this invention is directed to a process for effecting S- and the like alkylation of aromatic compounds having mercapto and the like reacting polar substituents under certain reaction conditions in the presence of the heretofore described catalysts, so that the polar substituents are changed by the addition of one or more alkyl groups.

It has been found that thiophenols and the like polar substituted aromatic compounds can be chain alkylated at low temperatures and in either vapor or mixed liquid-vapor phases in the presence of an alumino-silicate catalyst having active cation sites produced by exchangeable metal and/or hydrogen cations within its ordered internal structure. These exchangeable cations may be present within the catalyst as a result of conventional base exchanging of the cations with existing synthetic or naturally occurring alumino-silicates, incorporating the cations during the formation of a synthetic alumino-silicate or being the exchangeable cations usually found as an integral portion of a naturally occurring alumino-silicate zeolite. In accordance with this invention, the unique activity of catalysts for promoting S- or the like alkylation of the polar substituted aromatic compounds whereby the alkyl group is attached to sulfur or the like-reacting hetero atom in a polar substituent, is dependent both on the concentration of acid cation sites found within their ordered internal structure and on the availability of the sites for contact with the reactants.

In general, a catalyst having a high concentration of acid sites is more effective for S-alkylation of thiophenols and the like polar substituted aromatics than one having a sparse distribution of acid sites within its order internal structure. The highly acid alumino-silicate catalysts which have a high concentration of acid sites may be prepared by various methods. Often, the desired distribution of acid sites is produced by using metal and/or hydrogen ions to replace the exchangeable metal cations of an alumino-silicate. However, because some alumino-silicates are not stable to direct acid treatment or are not stable in an acid form, it is often necessary to exchange additional metal cations with the alumino-silicate to achieve the necessary stability and the desired distribution of acid sites.

It should be noted that in some instances there is no patent evidence for the presence of the hydrogen cation in the absence of reactant. For instance, some of the catalysts of this invention, when contacted with water, may be found to confer a neutral or even alkaline reaction to the water. In such instances, the hydrogen cation is believed to form, under reaction conditions, for example by dislocation of the alkali metal cation in contact with the reactant and/or traces of impurities such as water and $CO_2$, and the like.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by elemental analysis and reduction of exchange capacity. Thus, among the faujasite isomorphs, the zeolite known as "Y" will have a sparser distribution of sites within the pores than the zeolite known as "X." (These zeolites will be hereinafter described in greater detail.) It has been found that alumino-silicates having a high silicon to aluminum atomic ratio are more desirable for preparing the catalyst of this invention, preferably the silicon to aluminum atomic ratio is at least 1.8. These catalysts are readily treated to contact with solutions which contain hydrogen ions and are readily regenerable, after having been used, by contact at elevated temperatures with an oxygen containing stream under controlled conditions such that the carbonaceous residues may be efficiently removed without damage to the essential structure and properties of the catalyst.

In accordance with this invention, it has been found that cations of metals having higher valences, such as the rare earth metals as well as hydrogen ions, are particularly effective for producing the active cation sites within the alumino-silicate catalyst (high concentration of acid sites) necessary for the alkylation of polar substituents such as the mercapto and selenyl groups in contact with the catalysts. In some instances, those alumino-silicates having sparse distribution of hydrogen sites may also be employed as catalysts for the present process. Thus, the alkali metal and alkaline earth metal forms of the synthetic and naturally occurring alumino-silicates, including the faujasites such as zeolites X and Y, may serve as catalysts.

The unique activity of the alumino-silicate catalysts for effecting S- and the like alkylation is also dependent on the availability of the active sites. Accordingly, the defined pore size of an alumino-silicate is to be considered when preparing the catalyst of this invention. Generally, the alumino-silicate should have a pore size about 6 A. in diameter so that it can accept aromatic compounds within its ordered internal structure. Preferably, the pore size is from about 7 A. to 13 A. in diameter. It will be appreciated that the pore size required for a particular catalyst will depend on the polar substituted aromatic to be alkylated as well as the alkylating agent being employed.

Advantageously, several different alkylating agents can be used for the alkylation reactions of this invention. The preferred alkylating agents are olefins, such as ethylene, propylene, dodecylene and the like (those olefins containing 2 to 12 carbon atoms being particularly suitable; alkyl halides such as ethyl chloride, propyl bromide, and the like, and paraffinic alcohols, i.e. methanol, ethanol, propanol, and the like; in general, the alkyl radical portion thereof having from 1 to 20 carbon atoms. In addition, unsaturated cyclic compounds such as cyclohexene, aromatic compounds having substituents containing reactive alkyl groups such as anisole, and the like, can be used effectively as alkylating agents for the purpose of this invention. It will be appreciated that other cyclic and acyclic compounds may also be employed as alkylating agents.

One consideration for determining the applicability of such a compound is whether or not it has sufficient thermal stability to maintain its molecular identity at the operating conditions required by this invention. Also, the alkylating agent ideally should be chemically stable so that it will not readily polymerize with itself or other compounds present during the alkylation reaction; however, because some alkylating agents are particularly reactive in the presence of the catalysts of this invention and are susceptible to polymerization and other side reactions, the process may be regulated so that these agents may also be used.

Thus, it has been found that polymerization and other side reactions of the alkylating agent may be reduced by controlling the order of introducing the reactants into the reactor. The compound to be alkylated should be charged first and allowed to saturate substantially the catalyst before the highly reactive alkylating agent is introduced in the reactor. Similarly, it will be appreciated that when shutting down the reactor for regeneration of the catalyst or the like, the alkylating agent, especially an olefin, should be purged from the reactor prior to stopping the entry of the compound to be alkylated.

The process of this invention may be used to alkylate aromatic compounds having a variety of different polar substituents. Exemplary of these substituents are mercapto, selenyl, and like groups. Typical of the polar substituted aromatic compounds are thiophenol (benzenethiol), the thiocresols (1,3-benzenedithiol; 1,2-benzenedithiol; and 1,4-benzenedithiol), 2-naphthalenethiol, benzeneselenol, 1,3-benzenediselenol, 2-naphthaleneselenol and the like.

Furthermore, other radical substituents varying in polar orientation, may also be attached to the aromatic compound. Exemplary of these substituents are:

acetyl (—COCH$_3$),
benzoyl (—COC$_4$H$_5$),
isobutyrl (—COCH[CH$_3$]$_2$),
methyl sulfoxy (—SOCH$_3$),
methyl sulfonyl (—SO$_2$CH$_3$),
nitro (—NO$_2$),
cyano (—CN),
carboxy (—COOH),
carbethoxy (—COOC$_2$H$_5$),
trimethyl silyl (—Si[CH$_3$]$_3$),
trichloro silyl (—SiCl$_3$),
diethyl phosphonyl (—P[O][C$_2$H$_5$]$_2$),
chloro (—Cl),
fluoro (—F),
bromo (—Br),
iodo (—I),
trifluoromethyl (—CF$_3$), and the like.

It will also be appreciated that groups such as alkyl, aryl, phenyl, cyclohexyl, cycloalkyl, and the like, may be attached to the aromatic nucleus in addition to the mercapto or selenyl groups. Furthermore, the aromatic compounds contemplated by this invention include those of the benzene, anthracene, naphthalene, indane, and like series and homologs thereof.

The reactions contemplated by this invention are exemplified by the following equations:

I
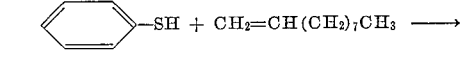
thiophenol      1-decene

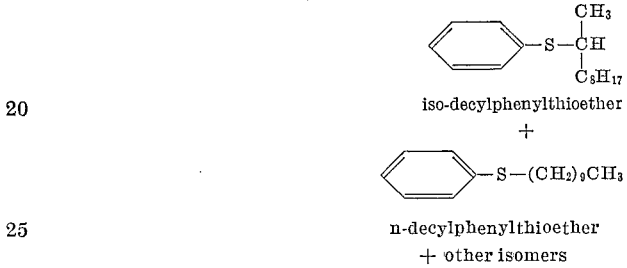

iso-decylphenylthioether
+
n-decylphenylthioether
+ other isomers

II
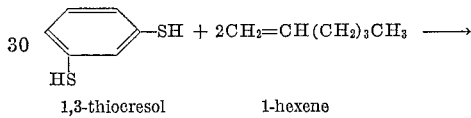
1,3-thiocresol      1-hexene

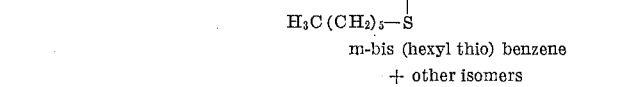

m-bis (hexyl thio) benzene
+ other isomers

It will be understood that the products produced by the alkylation process of this invention include thioethers, such as methylphenylthioether, n-propylphenylthioether, n-decylphenylthioether, n-butylnaphthylthioether and the like, the selenides such as methyl phenyl selenide, ethyl naphthyl selenide, n-propyl phenyl selenide and the like and derivatives thereof.

Typical of the alumino-silicate catalysts employed in accordance with this invention are several alumino-silicates, both natural and synthetic, which have a defined pore size of from 6 A. to 15 A. within an ordered internal structure. These alumino-silicates can be described as a three-dimensional framework of SIO$_4$ and AlO$_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of SiO$_2$, and $y$ the moles of H$_2$O. The cation can be of any or more of a number of metal ions whether the alumino-silicate is synthesized or occurs naturally. Typical cations include sodium, lithium, potassium, calcium, etc. Although the proportions of inorganic oxides in the silicates and their spatial arrangement may vary, effecting distinct properties in the alumino-silicates, the two main characteristics of these materials is the presence in their molecular structure of at least 0.5 equivalent of an ion of positive valence per gram atom of aluminum, and an ability to undergo dehydration without substantially affecting the SiO$_4$ and AlO$_4$ framework.

One of the crystalline alumino-silicate catalysts utilized by the present invention is the synthetic faujasite designated as zeolite X, and is represented in terms of mole ratios of oxides as follows:

$$1.0 \pm 0.2\ M_{2/n}O : Al_2O_3 : 2.5 \pm 0.5\ SiO_2 : yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9\ Na_2O : Al_2O_3 : 2.5\ SiO_2 : 6.1\ H_2O$$

Zeolite X is commercially available in both the sodium and the calcium forms. It will be appreciated that the crystalline structure of zeolite X is different from most zeolites in that it can adsorb molecules with molecular diameters up to about 13 A., such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic zeolite, having the same crystalline structure as zeolite X and designated as zeolite Y has been found to be active. Zeolite Y differs from zeolite X in that it contains more silica and less alumina. Consequently, due to its higher silica content, this zeolite has more stability to the hydrogen ion than zeolite X.

Zeolite Y is represented in terms of mole ratios of oxides as follows:

$$0.9 \pm 0.2\ Na_2O : Al_2O_3 : wSiO_2 : xH_2O$$

wherein $w$ is a value greater than 3 up to about 5, and $x$ may be a value up to about 9.

The selectivity of zeolite Y for larger molecules is approximately the same as zeolite X because its pore size extends from 10 A. to 13 A.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

$$Na_8(AlO_2)_8(SiO_2)_{40} \cdot 24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

In addition, other alumino-silicates may be employed as catalysts for the alkylation processes of this invention. A criterion for the catalyst is that its ordered internal structure must have defined pore sizes of sufficient diameter to allow entry of the preselected reactants and the formation of the desired alkylation products. Also, the alumino-silicate advantageously should have ordered internal structure capable of chemisorbing or ionically bonding additional metal and/or hydrogen ions within its pore structure so that its catalytic activity may be altered for a particular alkylation reaction. Among the naturally occurring crystalline alumino-silicates which may be employed are faujasite, heulandite, clinoptilolite, mordenite, and dachiardite. These silicates are particularly effective because they have been found to have the ability to adsorb hydrocarbons containing three or more carbon atoms and also aromatic hydrocarbons such as benzene within their internal structure.

One of the preferred alumino-silicate catalysts for the process of this invention is prepared from the sodium form of zeolite X ("Linde 13X") as a result of a conventional treatment (base exchanging) involving partial replacement of the sodium by contact with a fluid medium containing cations of at least one of the rare earth metals. Any medium which will ionize the cations without affecting the crystalline structure of the zeolite may be employed. After such treatment, the resulting exchanged zeolite product is water washed, dried, and dehydrated. The dehydration thereby produces the characteristic system of open pores, passages, or cavities of the crystalline alumino-silicates.

As a result of the aforementioned treatment, the rare earth exchanged alumino-silicate is an activated crystalline catalyst in which the molecular structure has been changed by having metallic rare earth cations and hydrogen ($H^+$) cations chemisorbed or ionically bonded thereto. It will be understood that the pore size of the rare earth exchanged catalyst may vary from 10 A. to about 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, wtih minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths, 1–2% by weight. It is to be understood that other mixtures of rare earths are equally applicable in the instant invention.

Other effective catalysts for the present alkylation process can be prepared from alumino-silicates such as zeolite Y and mordenite. Exchange of rare earth metals for the sodium ions within zeolite Y produces a highly active catalyst in a manner similar to that described for preparation of the rare earth exchanged zeolite X. In addition, because of its high acid stability, zeolite Y may be treated by partially replacing the ions with hydrogen ions. This replacement may be accomplished by treatment with a fluid medium containing a hydrogen ion or an ion capable of conversion to a hydrogen ion. Inorganic acids represent the source of hydrogen ions, whereas ammonium compounds are representative of the cations capable of conversion to hydrogen ions. It will be appreciated that the fluid medium may contain a hydrogen ion, an ammonium ion or a mixture thereof in a pH range from about 1 to about 12.

Mordenite may be activated to serve as a catalyst for the instant invention by replacement of the sodium ion with a hydrogen ion. The necessary treatment is essentially the same as that described above for the preparation of acid zeolite Y. In general, the mordenite is reduced to a fine powder (approximately passing the 200 mesh sieve and preferably passing the 300 and 325 mesh sieves or finer) and then acid treated.

It will be appreciated that cations of other metals than the rare earths having mono- and polyvalences may be employed to replace the exchangeable cations from the alumino-silicates to provide a catalytic material for this alkylation process. Exemplary of the more effective metals are zinc, copper, magnesium, tin, cobalt, silver, and the like. Moreover, other higher valence metals such as titanium, vanadium, chromium, manganese, iron, and the like may also be employed. It will be understood that the chemical properties of the metal, i.e. its atomic radius, degree of ionization, hydrolysis constant, and the like, will determine its suitability for exchange with a particular alumino-silicate.

The alumino-silicate catalyst of this invention may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combination of these oxides with one another and with other components. Other suitable supports include activated charcoal, mullite, kieselguhr, bauxite, silicon carbide, sintered alumina and various clays. These supported crystalline alumino-silicates may feasibly be prepared as described in abandoned application of Albert B. Schwartz, Ser. No. 147,722, filed Oct. 26, 1961, which was refiled as application Ser. No. 430,212, on Feb. 3, 1965, and issued as U.S. 3,244,643, by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia, and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ in size, for example, obtained upon pelleting the alumino-silicate with a suitable binder such as clay. The zeolite described hereinabove may be obtained on a clay-free basis or in the form of pellets in which clay is present as a binder.

Because of the unique activity of the catalyst contemplated by this invention, it has been found that the alkylation process of this invention may be carried out at relatively mild operating conditions thereby increasing catalyst life, avoiding frequent regeneration of contaminated catalyst, and facilitating the use of a wide variety of alkylating agents.

Advantageously, the temperature of this process may extend from about 0° C. to about 550° C.; preferably the process is operated at temperatures from about 100° C. to about 300° C. For example, 1-decene has been found to alkylate thiophenol at 182° C. in the presence of a hydrogen exchanged zeolite Y catalyst.

The upper temperature limits are, in general, determined by the thermal stability of the alkylating agents. For example, above about 400° C. the olefins tend to undergo degradation and rapid polymerization thereby substantially reducing the yield of reaction products and providing tarry-like residues which clog or block off the pores or passages within the ordered internal structure of the alumino-silicates.

The pressures required for this process may be at atmospheric or greater than atmospheric pressure. When the reactants are of sufficiently high boiling point, it is more convenient to carry out the process in stirred reactors at atmospheric pressure; with lower boiling point reactants, a stirred pressurized autoclave is preferred. Additionally, continuous process units may be used with fixed or moving beds of catalyst. In certain instances it is desirable that the pressure be sufficient to maintain at least one of the reactants or reaction products in the liquid phase. Mixed vapor-liquid phase operation is believed to promote the length of catalytic activity by preventing formation of olefinic polymers and by washing out other by-product high molecular weight compounds from the internal structure of the catalyst caused by the above-mentioned side reactions.

The choice of pressure often is determined by the particular combination of polar substituted aromatic and alkylating agent to be reacted. Thus, in certain instances where the alkylating agent is not readily soluble in the polar-substituted aromatic compound, e.g. ethylene and other gaseous alkylating agents or where the polar compound is selectively adsorbed by the catalyst, it has been found that high pressure operation promotes effective alkylation of the polar compounds.

The relative molar ratios of the reactants charged to the process may vary from stoichiometric proportions to molar ratio of the polar substituted aromatic to alkylating agent of about 12 to 1. In general, the alkylating agent is used in small quantities since many, such as the olefins, tend to polymerize in the presence of the aluminosilicate catalyst of this invention. It will be appreciated that the specific molar ratio between reactants is determined by the nature of the reactants, the operating conditions employed, the nature of the product desired, i.e. whether mono- or poly-alkylation is desired, and the alumino-silicate catalyst being used.

It will be appreciated that, because of the unique activity shown by the alumino-silicate catalysts contemplated by the present invention, the alkylating agents may be employed in fluid media which contain major proportions of inert diluents, such as nitrogen, propane, and the like. The advantages of such operation will readily be apparent because of the availability and low cost of obtaining such dilute process streams during hydrocarbon processing. In addition, by employing dilute olefin streams, the formation of polymerized products within or on the ordered internal structure of the alumino-silicate catalysts is substantially reduced.

In addition, the unique activity of the alumino-silicate contemplated by this invention may be continuously activated so as to maintain a high level of activity while on stream. This continual activation is effected by controlling the sparsity of distribution of active acid sites formed within the ordered internal structure of the catalyst. It will be realized that, during alkylation of the polar-substituted compounds, some degradation and polymerization products are formed which produce a coke-like material on the alumina-silicate catalyst. The accumulation of this material causes the catalyst to gradually lose its effective activity by blocking off the active acid sites for contact with the reactants. However, it has been found that the effects of these undesirable products may be controlled by the introduction of carbon dioxide in the charge stream and/or by the introduction of controlled amounts of water, water vapor, steam and other like oxygen-containing compounds into the reactants. It will be appreciated that these activators may be introduced in the charge stream or in separate streams if desired. The activators are particularly effective with alkali metal salts of the alumino-silicate catalysts. In general, the molar ratio between the reactants and the activating materials may range from about 0.001 to about 0.5. It will be appreciated that the selection of a particular activating material as well as its mode of introduction will be dependent upon the catalyst to be activated and the reactants being employed.

It will be also appreciated that the operating conditions employed by the present invention will be dependent on the specific alkylation reaction being effected. Such conditions as temperature, pressure, space velocity, and molar ratio of the reactants and the presence of inert diluents will have important effects on the process. Accordingly, the manner in which these conditions affect not only the conversion and distribution of the resulting alkylated polar products but also the rate of deactivation of the catalyst will be described below.

The process of this invention and the results obtained thereby may be more readily understood by reference to the following examples which are illustrative of the reactants, operating conditions, and the catalyst employed therein.

The following examples were conducted as batch processes utilizing a conventional heated reactor with a stirrer. Product composition was evaluated by fractionation, gas chromatography, or infrared techniques.

EXAMPLE I

A charge of 27.0 grams of freshly distilled thiophenol (0.25 mole) and 35.0 grams of 1-decene (0.25 mole) is stirred with 5.0 grams of a hydrogen exchanged zeolite Y catalyst in a batch type reactor at 182° C. After two hours the resulting reaction is terminated. Then the catalyst is removed and 54.15 grams of a yellow liquid product is recovered.

Analysis of the product by vapor phase chromatography gives the following composition:

TABLE 1

| Compounds | Wt. Percent | Mole Percent |
|---|---|---|
| Thiophenol | 12.1 | 24.8 |
| iso-Decyl phenyl sulfides | 60.2 | [1] 54.2 |
| n-Decyl phenyl sulfides | 16.1 | [1] 14.2 |
| C-decyl decylphenyl sulfides | 11.5 | 6.7 |

[1] Molar ratio of iso-/n-=3.77.

Inspection of the above data shows that 100% of the 1-decene was converted to a mixture of products and that 91.8% of the 1-decene appears as S-alkyl groups (thioether or alkyl sulfide groups); whereas 8.2% of the 1-decene appears as C-alkyl groups.

EXAMPLE II

Using the procedure outlined in Example I, several runs are conducted using different aluminosilicate catalysts and a variety of aromatics and alkylating agents at temperatures ranging from about 120° C. to about 300° C.

As shown by the data in the table below, high conversions to the desired products are obtained in all the runs. The following abbreviations are used in the table to designate the catalysts:

HY=Hydrogen exchanged zeolite Y
REY=Rare earth exchanged zeolite Y
H+Mord.=Hydrogen exchanged mordenite

TABLE 2

| Catalyst | Aromatic Compound | Alkylating Agent | Temp., ° C. | Conv.,[1] Percent |
|---|---|---|---|---|
| HY | Thiophenol | Ethanol | 200 | 80 |
| REY | m-Toluenethiol | Ethylchloride | 210 | 70 |
| H+=Mord | Thiophenol | 1-heptene | 180 | 55 |

[1] Percent conversion of the alkylating agent to form S-alkyl groups.

It will be appreciated that the foregoing examples are merely illustrative of the reactants and catalysts that may be employed in the process of this invention and that other polar substituted aromatics, alkylating agents and alumino-silicates as enumerated in the specification can also be employed by this invention.

It will be further appreciated that the operating conditions for the alkylation reactions in accordance with the process of this invention, as exemplified in the foregoing examples and specifications, may be varied so that the process can be conducted in vapor phase or mixed liquid-vapor phase, depending on product distribution, degree of alkylation, rate of catalyst deactivation, and operating pressures and temperatures, and that various modifications and alterations may be made in the process of this invention without departing from the spirit of the invention.

What is claimed is:

1. A process for chain alkylating an aromatic compound having a polar substituent group selected from the class consisting of mercapto and selenyl groups attached to an aromatic nucleus which comprises effecting reaction of said polar substituted aromatic compound with an alkylating agent in the presence of a catalyst consisting essentially of a crystalline alumino-silicate having exchangeable cations and an ordered internal structure under conversion conditions; said ordered internal structure having a defined pore size of at least 6 A.

2. The process of claim 1 in which said reaction is effected at a temperature from about 0° C. to about 550° C.

3. The process of claim 1 in which the nucleus of said aromatic compound is selected from the group consisting of benzene, anthracene, naphthalene, and indane.

4. The process of claim 1 in which the alkylating agent is selected from the group consisting of olefins containing 2 to 20 carbon atoms, alkyl halides and aliphatic alcohols containing from 1 to 20 carbon atoms in the alkyl group, cyclic unsaturated hydrocarbons containing 5 to 20 carbon atoms and aryl alkyl ethers containing from 7 to 20 carbon atoms.

5. The process of claim 1 in which the cations are selected from the group consisting of exchangeable metals, hydrogen, and mixtures thereof.

6. The process of claim 1 in which the aluminosilicate has a silicon to aluminum atomic ratio of at least 1.8 within an ordered internal structure.

7. The process of claim 1 in which said cations are of the rare earth metals.

8. The process of claim 1 in which said aluminosilicate catalyst is a rare earth exchanged faujasite.

9. The process of claim 1 in which said aluminosilicate catalyst is an acid mordenite.

10. The process of claim 1 in which said aluminosilicate catalyst is contained in and distributed throughout a matrix binder material.

11. The process of claim 1 in which thiophenyl is reacted with 1-decene in the presence of a catalyst consisting essentially of a hydrogen exchanged zeolite Y at a temperature from about 120° C. to about 300° C. and recovering a product containing decyl phenyl sulfides.

12. The process of claim 1 in which m-toluenethiol is reacted with ethyl chloride in the presence of a catalyst consisting essentially of hydrogen exchanged zeolite Y at a temperature from about 100° C. to about 300° C. and recovering a product containing m-tolyl ethyl sulfides.

13. The process of claim 1 in which thiophenyl is reacted with 1-heptene in the presence of a catalyst consisting essentially of a hydrogen exchanged mordenite at a temperature from about 100° C. to about 300° C. and recovering a product containing heptyl phenyl sulfides.

14. The process of claim 1 in which thiophenyl is reacted with ethanol in the presence of a catalyst consisting essentially of a hydrogen exchanged zeolite Y at a temperature from about 100° C. to about 300° C. and recovering a product containing ethyl phenyl sulfides.

References Cited

UNITED STATES PATENTS 2,610,981   9/1952   Short _____ 260—609

OTHER REFERENCES

Reid: Organic Chemistry of Bivalent Sulfur, volume II, page 31 (1960).

CHARLES B. PARKER, *Primary Examiner.*

DELBERT R. PHILLIPS, *Assistant Examiner.*